Patented Sept. 4, 1945

2,384,085

UNITED STATES PATENT OFFICE 2,384,085

PROCESS OF FORMING A CLEAR PLASTICIZED STYRENE-MALEIC ANHYDRIDE RESIN

Howard L. Gerhart, Milwaukee, Wis., assignor to Pittsburgh Plate Glass Company, Allegheny County, Pa., a corporation of Pennsylvania No Drawing. Application April 3, 1941,
Serial No. 386,687

4 Claims. (Cl. 260—36)

The present invention relates to artificial resins and it has particular relation to such resins as are obtained by reacting substituted or unsubstituted $\alpha\beta$ unsaturated $\alpha\beta$-dicarboxylic acids or anhydrides thereof with a polymerizable olefin.

One object of the invention is to provide a clear, hard, tough, stable and well plasticized resin of the above type which is relatively free from bubbles or cavities.

A second object of the invention is to provide a resinifying fluid material that can be cast or employed as an investment medium and formed into clear, hard, durable and tough bodies at low temperatures and with but little distortion.

A third object of the invention is to provide an improved method of incorporating the plasticizer with the resin.

These and other objects will be apparent from consideration of the following specification and the appended claims.

It has heretofore been proposed to heat an unsaturated dicarboxylic acid, such as maleic acid or its anhydride and a polymerizable olefin such as styrene to obtain polymerization products of white powdery character, which are soluble in acetone and dilute alkalies.

My copending application Serial No. 242,127, filed November 23, 1938, is based upon the discovery that unsaturated dicarboxylic acids of the type of maleic acid, or maleic anhydride, or fumaric acid, or substituted maleic or fumaric acid and polymerizable olefins of the type of styrene will under the influence of actinic radiation react to form clear and hard resins which are relatively insoluble and substantially free of voids. These resins are well adapted for molding, cutting, pressing, or otherwise forming into bodies of great beauty. The resin-forming reaction may be carried out completely or at least in its final stages by casting the reacting mass in a suitable mold, thus obtaining directly the finally desired object.

However, considerable difficulty has been experienced in adequate plasticization of the resin in order to obtain clear, hard and tough bodies, that maintain that condition over long periods of time.

Very few plasticizers are adequately compatible to admit of satisfactory use and those that are compatible usually are too volatile to admit of permanent plasticization.

The present invention is based upon the discovery that dimethyl phthalate is of outstanding merit as a plasticizer for resins of the foregoing type. It can be incorporated with the reactants prior to or during polymerization, but preferably before solidification, without objectionable effects upon the reaction. The resin, under appropriate conditions, sets into a transparent, hard, bubble free, and well plasticized solid, which is not subject to warping and cracking and which maintains its properties well upon aging.

The reaction to form the new resins is typified by that between maleic acid or maleic acid anhydride and styrene. The two compounds, along with dimethyl phthalate, are simply admixed directly or are introduced into a solvent such as triacetin and are then caused to react by actinic irradiation at a temperature withiln the range of about 20 to 50° C. Irradiation of the reactants may be continued throughout the period of reaction, but it may be discontinued after the reaction has started. It is also possible to introduce a small amount (e. g., 1 to 10%) of preliminarily irradiated reactants into the main batch and thus to obviate further irradiation.

Reaction may also be initiated by application of heat and after it has progressed sufficiently far, heating is discontinued. If very hard products are desired the mass may be finally heat treated at a suitable temperature (e. g., 100–200° C.) until the desired stage is reached.

The reaction can be brought to completion within an hour or less, but by reducing the degree or time of irradiation it is possible to extend it over a period of several days.

The reaction product obtained from maleic anhydride and styrene may be represented by the formula:

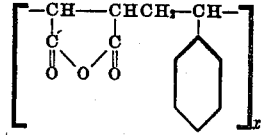

where $x$ represents the number of the foregoing groups in the molecule and is of variable value.

Since the reaction is general in character and applies to many unsaturated dicarboxylic acids or anhydrides; i. e., substituted maleic or fumaric acid and to many of the polymerizable olefins, the product may be represented by the type formula:

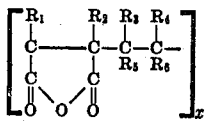

where the groups $R_1R_2R_3R_4R_5R_6$ may be practically any of the possible substituent groups. Examples of a few of the possibilities include hydrogen and chlorine, carbonyl, carboxyl, alkyl, aromatic and the like groups. Examples of possible ethylene αβ-dicarboxylic acids or ethylenic dicarboxylic acids which are transformable to αβ-form, which may be employed, include maleic acid (above described), fumaric acid, the mono or di chloro substituted maleic and fumaric acids, alkylated maleic and fumaric acids, such as itaconic, citraconic acid, mesaconic acid, mono and di phenyl maleic acid, benzyl maleic, dibenzyl maleic, ethyl maleic, or any similar acids containing a double bond in the chain between the two carboxyl groups.

The number of polymerizable olefinic compounds is also very large and of general character. It includes styrene above described, vinyl acetate, vinyl chloride, methyl styrene, parahydroxy styrene, acrylic acid, methyl, ethyl, or other esters of acrylic acid, acrolein, unsaturated ketones, such as methyl vinyl ketone, indene, coumarone and the like.

It is to be understood that any one or more of the dicarboxylic acids can be combined with any one or more of the olefinic compounds, to provide resins in great variety. The ratio of the dicarboxylic acid to the olefinic compound is susceptible of wide variation, but for purposes of illustration may be considered as approximately molar.

As previously stated, the reaction can be conducted in the absence of solvents. However, in some instances it may be preferable to dissolve or admix the reactants with solvents such as triacetin, acetone, methyl ethyl ketone, ethyl aceto acetate, diacetone, acetic anhydride, mesityl oxide, or any other solvent for the reactants.

Oxidizing agents such as benzoyl peroxide may be employed to speed up reaction of the resin-forming materials. Reducing agents, such as hydroquinone, pyrogallol, tannic acid, etc. may be employed to retard reaction.

The solvents in many cases are imbibed in the resinous reaction product without dissolving the latter and when so incorporated can not readily be removed by evaporation. Therefore, they may be retained as permanent components of the resinous body. The bodies still retain their clarity, hardness and toughness and usually are bubble free. The solvated resins may be hardened by baking them for a short time.

As previously stated, the resinous bodies are insoluble, but it is possible to cast incipiently polymerized masses into molds in which hardening to final form is effected. It is also possible to conduct polymerization in molds formed of soft glass, Pyrex, or other material transparent to actinic rays. Likewise it is possible to introduce reactive mixtures containing at least a portion of irradiated material into opaque molds of rubber or nitrocellulose and then to complete polymerization. It is also possible to heat the resins to the softening point and then to press them to shape.

A further application of the invention consists in providing a layer of polymerizable materials between two sheets of glass. By irradiating this glass, it is possible to form a film of transparent closely adherent resin between the glass sheets, thus forming a safety glass. The materials may be partially polymerized prior to application to glass. In a similar manner this class of resins may be employed in the lamination of wood, fabrics or other materials.

Resinous bodies can be cut to any desired form and then polished to provide a great variety of articles. The resins and scraps of the resin may be shredded or powdered and then molded under heat and pressure, or the comminuted material may be mixed with further polymerizable material which by appropriate treatment will be converted into hard bonding resins. Oil-soluble dyes, such as Rhodamin B. Victoria Green, and pigments such as titanium dioxide may be incorporated into the resins prior to final solidification.

The new resins may be employed in the formation of optical lenses, jars, or lids for jars for cosmetics, drugs, foods and the like. They may be cast or cut to form an infinite variety of handles, buttons, and objects of similar nature, or cast about specimens or objects of art to effect an embedment thereof. They may, also, be used for the formation of panels and coverings for electrical apparatus of a great variety.

Application of the principles of the invention is illustrated by the following examples:

*Example I*

|  | Grams |
|---|---|
| Maleic anhydride | 25 |
| Styrene | 36 |
| Dimethyl phthalate | 40 |

The mixture was heated to dissolve the maleic anhydride. The clear liquid was placed in a large test tube and irradiated with sunlight for 15 minutes, or until it became cloudy and opaque. The test tube was placed in subdued light at room temperature. The reaction proceeded slowly and was complete in six hours. At the end of this time, it was placed in the direct sunlight for 30 minutes. The rod of clear, hard, transparent resin was removed from the test tube.

*Example II*

| | | |
|---|---|---|
| Maleic anhydride | gm | 25 |
| Dimethyl phthalate | gm | 35 |
| Styrene | cc | 35 |

The mixture was heated to 130° C. on the hot plate to form a light syrup. This was cooled to room temperature, whereup a heavy clear syrup was formed. This was poured over some dried Japanese beetles in a glass vial. The vial was placed in the direct sunlight until the resin hardened. This produced a well mounted specimen suitable for examination or exhibition. Other objects imbedded by means of this composition are flowers, rocks, shells, wooden objects, larvae, butterflies, and photographs.

Instead of irradiating the syrup with sunlight, the reaction was also caused to proceed by means of diffused light, light from a carbon arc, or by gently heating. It was accelerated by the addition of .01% benzyl peroxide. Any type of mold may be used, but is generally desirable to provide an opening for the admission of light.

*Example III*

A sample of a solution from Example 2 was placed between two glass plates of soft gloss and irradiated for one hour as described. The resin formed as a thin film between the plates which were not easily separated.

*Example IV*

A portion of the solution of Example 2 was irradiated for five minutes until it had congealed to incipient gellation (the mass could still be poured). This enabled more of the material to be placed between the plates. During the second 15 minutes of irradiation, pressure was applied to the plates. The finished plates adhered well and shattered with difficulty.

In a further example dimethyl phthalate in combination with butyl phthalate was employed as a plasticizer for styrene-maleic resin. The composition was as follsw:

*Example V*

|   | Grams |
|---|---|
| Maleic anhydride | 25 |
| Styrene | 31 |
| Dimethyl phthalate | 30 |
| Dibutyl phthalate | 5 |

In the foregoing examples the dicarboxylic acids and their anhydrides are to be considered as equivalents, since each anhydride is derived from the acid merely by elimination of a mole of water and the ester is the same regardless of whether the acid or the anhydride is employed. Therefore, the term anhydride in the claims includes the acids and the term acid includes the anhydrides.

The embodiments of the invention herein described are merely exemplary and numerous modifications may be made therein without departure from the spirit of the invention or the scope of the appended claims.

What I claim is:

1. A method of forming clear, hard and strong plasticized bodies of styrene-maleic anhydride resin, which method comprises admixing styrene, maleic acid and dimethyl phthalate and then subjecting the styrene and maleic acid to polymerization to form the resin in the presence of dissolved plasticizer.

2. A process as defined in claim 1, in which polymerization is effected by irradiation of the reactants.

3. A method of forming clear, hard and strong plasticized bodies of styrene-maleic anhydride resin, which method comprises heating maleic anhydride, styrene and dimethyl phthalate to form a clear solution, then polymerizing the maleic anhydride and styrene in the solution to form said resin.

4. A process as defined in claim 3, in which the polymerization is effected by irradiation at a relatively low temperature.

HOWARD L. GERHART.